May 28, 1957 L. B. GOMEZ 2,793,651
COMBINED AIR VALVE AND HORN SUPPORT
Filed Dec. 14, 1953
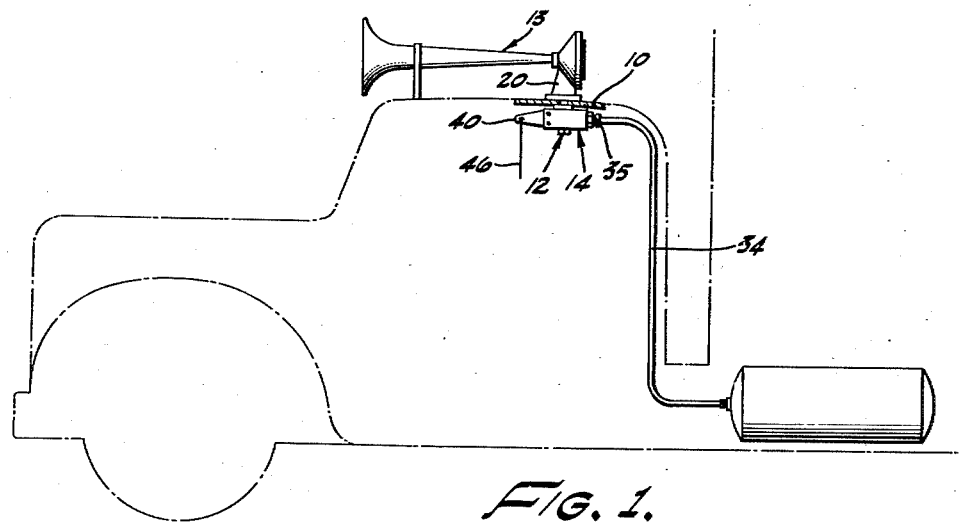
FIG. 1.
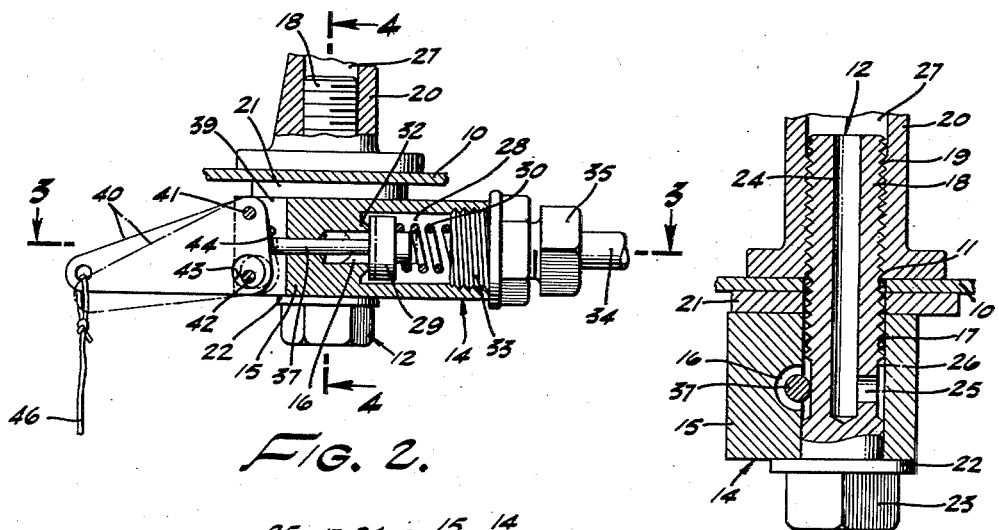
FIG. 2.
FIG. 4.
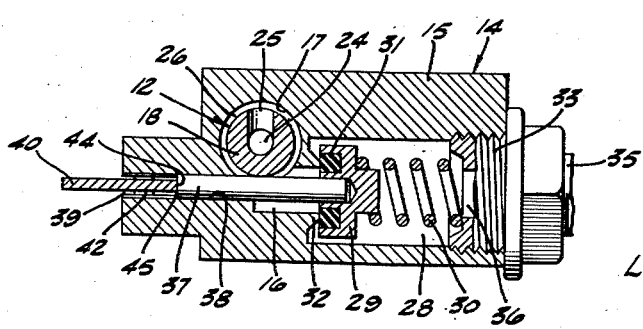
FIG. 3.
LAURENCE B. GOMEZ
INVENTOR.
BY *Lyon Lyon*
ATTORNEYS the port 25 to the passage 24 and enters the interior space 27 within the base 20 for actuation of the air horn assembly 13.

2,793,651
COMBINED AIR VALVE AND HORN SUPPORT

Laurence B. Gomez, Pasadena, Calif., assignor to Grover Products Company, Los Angeles, Calif., a corporation of California Application December 14, 1953, Serial No. 398,109

3 Claims. (Cl. 137—316)

This invention relates to apparatus for supporting a fluid actuated device and for regulating the supply of fluid thereto. More particularly this invention concerns an air valve and support for an air horn assembly of the general type employed on trucks, automobiles, busses, locomotives, etc.

Air horn assemblies are commonly mounted in an exposed location such as, for example, on top the cab of the vehicle. The air control valve for operating the horn assembly is mounted inside the cab for protection from the elements and for easy access by the driver. Heretofore, several fittings have been required for supporting the horn assembly and the control valve and for connecting the two together. The several parts of the arrangement required an excessively long time to assemble and adjust.

It is the principal object of this invention to remedy these difficulties and provide in a single fitting a combined control valve and a support for an air horn assembly. Another object is to provide such a device which is easy to install and to maintain. Another object is to provide a novel form of such device in which the various operating parts cooperate to prevent disassembly of certain of the parts before and during installation. Other and more detailed objects and advantages will appear hereinafter.

In the drawings:

Figure 1 is a side elevation showing a preferred embodiment of my invention, as applied to the cab of a truck;

Figure 2 is a longitudinal section view;

Figure 3 is a sectional view, taken substantially on lines 3—3 as shown on Figure 2; and Figure 4 is a transverse sectional view, taken substantially on lines 4—4 as shown on Figure 2.

Referring to the drawings, the supporting member 10 may constitute a part of the cab of a truck or other vehicle. A single aperture 11 is drilled or otherwise formed in this support member. In accordance with my invention a bolt 12 projects through this aperture 11 and serves to clamp both an air horn assembly 13 and a control valve assembly 14 to the supporting member 10.

The control valve assembly 14 includes a housing 15 having a longitudinal opening 16 intersecting a transverse bore 17. The bore 17 receives the shank 18 of the bolt 12. The greater portion of the length of the shank is externally threaded at 19 for reception into the internally threaded base 20 of the air horn assembly 13. A washer 21 may be interposed between the housing 15 and supporting member 10, and another washer 22 may be placed between the housing 15 and the bolt head 23.

The shank 18 of the bolt 12 has an axial passage 24 extending to the end of the shank. A lateral port 25 connects this axial passage with an annular groove 26 formed on the outer surface of the shank. The groove 26 lies adjacent the opening 16 in the housing 15, so that when a pressure fluid, such as air under pressure, is introduced from the opening 16 into the groove 26, it passes into the port 25 to the passage 24 and enters the interior space 27 within the base 20 for actuation of the air horn assembly 13.

The longitudinal opening 16 includes an enlarged cavity 28 for reception of a movable valve element 29 and a spring 30. The spring 30 acts in a direction to hold the annular resilient portion 31 of the valve element 29 in sealing engagement with the stationary valve seat 32 provided on the housing 15. One end of the spring 30 rests against the bushing 33 and the other end of the spring engages the valve element 29. Air under pressure reaches the cavity 28 from the conduit 34 by way of the attachment fitting 35 and the central opening 36 in the bushing 33.

A valve actuator element rod rod 37 is secured to the valve element 29 and extends slidably into a guide bore 38 in the housing 15 and projects into a slot 39. The slot 39 slidably receives a trigger plate 40. This trigger plate 40 is pivotally mounted on the housing 15 by means of a pivot pin 41. A second pin 42 extends through an enlarged clearance opening 43 in the pivotally mounted trigger plate 40 to limit pivotal movement thereof. The rear edge 44 of the trigger plate 40 engages the forward end 45 of the valve rod 37. When the trigger plate 40 is swung in a counterclockwise direction, as viewed in Figure 2, the rod 37 moves to the right and moves the valve element 29 away from the valve seat 32. This action permits a flow of air under pressure from the cavity 28 into the axial passage 24 in the bolt 12. The trigger plate 40 may conveniently be actuated by means of a cord 46, and release of the cord 46 allows the spring 30 to return the valve element 29 to closed position and to return the trigger plate 40 to the full line position shown in Figure 2.

As shown clearly in Figure 4, the actuator rod 37 extends into a portion of the annular groove 26 on the bolt 12. By this means the bolt 12 is prevented from dropping out of the bore 17 in the housing 15 before or during assembly of the parts on the cab of the vehicle.

Having fully described my invention it is to be understood that I am not to be limited to the details herein set forth, but that my invention is of the full scope of the appended claims.

I claim:

1. In a device of the class described for installation upon a member having an aperture, the combination of: a housing having a transverse bore extending therethrough, a bolt slidably received within the bore and having a threaded shank adapted to project through said aperture, the shank having an external peripheral groove, the shank also having an axial passage extending to the projecting end of the bolt and a lateral port establishing communication between the passage and the groove, the housing having a longitudinal opening communicating with the bore adjacent said groove, releasable means for connecting a pressure fluid conduit to said housing in communication with said opening, valve means within said housing controlling flow of such pressure fluid including a longitudinally movable actuator element, said element extending into a portion of said grove to prevent axial disassembly of the bolt from the housing.

2. In a device for mounting an air horn assembly upon a vehicle cab roof, the roof having an aperture, the combination of: a housing having a transverse bore extending therethrough, a bolt slidably received within the bore and having a threaded shank adapted to project through said roof aperture to engage an element of the air horn assembly, the shank having an external peripheral groove, the shank also having an axial passage extending to the projecting end of the bolt and a lateral port establishing communication between the passage and the groove, the housing having a longitudinal opening communicating with the bore adjacent said groove, means including a pressure fluid conduit for delivering a pressure fluid into said opening, valve means within said housing controlling flow of such pressure fluid including a longitudinally movable actuator element, said element extending into a portion of said groove to prevent axial disassembly of the bolt from the housing prior to installation upon the vehicle cab roof.

3. In a device of the class described for installation upon a member having an aperture, the combination of: a housing having a transverse bore extending therethrough, a bolt slidably received within the bore and having a threaded shank adapted to project through said aperture, the shank having an external peripheral groove, the shank also having an axial passage extending to the projecting end of the bolt and a lateral port establishing communication between the passage and the groove, the housing having a longitudinal opening communicating with the bore adjacent said groove, means on the housing for removably connecting a conduit thereto for delivering pressure fluid into said opening, valve means within said housing controlling flow of such pressure fluid, said valve means including a valve seat on the housing and a movable valve part adapted to close against said seat and thereby prevent flow of pressure fluid into said groove, said valve means also including a longitudinally movable actuator rod adapted to move the valve part away from said valve seat, said actuator rod extending into a portion of said groove to prevent axial disassembly of the bolt from the housing.

References Cited in the file of this patent

UNITED STATES PATENTS

| | | |
|---|---|---|
| 1,305,519 | Borton | June 3, 1919 |
| 1,899,731 | Scofield | Feb. 28, 1933 |
| 1,935,797 | Hewitt | Nov. 21, 1933 |
| 2,362,352 | Buttner | Nov. 7, 1944 |